(12) United States Patent  
Archambault et al.

(10) Patent No.: US 8,498,979 B1
(45) Date of Patent: Jul. 30, 2013

(54) SYSTEM AND METHOD FOR SEMANTIC ANALYSIS OF SOCIAL NETWORK USER ACTIVITIES

(75) Inventors: Martin-Luc Archambault, Montreal (CA); André-Philippe Paquet, Verdun (CA)

(73) Assignee: Wajam Internet Technologies Inc., Montreal (CA)

( * ) Notice: Subject to any disclaimer, the term of this patent is extended or adjusted under 35 U.S.C. 154(b) by 0 days.

(21) Appl. No.: 13/400,086

(22) Filed: Feb. 19, 2012

Related U.S. Application Data

(63) Continuation-in-part of application No. 13/352,957, filed on Jan. 18, 2012, and a continuation-in-part of application No. 13/346,342, filed on Jan. 9, 2012.

(51) Int. Cl.
*G06F 7/00* (2006.01)
*G06F 17/00* (2006.01)

(52) U.S. Cl.
USPC .......................................................... 707/711

(58) Field of Classification Search
USPC .......................................................... 707/711
See application file for complete search history.

(56) References Cited

U.S. PATENT DOCUMENTS

| | | | |
|---|---|---|---|
| 7,657,523 B2 | 2/2010 | Ebanks | |
| 7,827,176 B2 | 11/2010 | Korte et al. | |
| 7,958,104 B2 | 6/2011 | O'Donnell | |
| 8,019,743 B2 | 9/2011 | Ebanks | |
| 2009/0112727 A1* | 4/2009 | Chi et al. | 705/26 |
| 2009/0204601 A1 | 8/2009 | Grasset | |
| 2011/0087534 A1* | 4/2011 | Strebinger et al. | 705/14.25 |
| 2011/0093498 A1 | 4/2011 | Lunt et al. | |

OTHER PUBLICATIONS

Horowitz & Kamvar, "The Anatomy of a Large-Scale Social Search Engine", Apr. 26-30, 2010, Raleigh, North Carolina, 10 pages.
Nelson, "Can adding friends on Facebook grow your brain?", Mother Nature Network, [online], [retrieved on Oct. 18, 2011].

* cited by examiner

*Primary Examiner* — James Trujillo
*Assistant Examiner* — Jeffrey Chang
(74) *Attorney, Agent, or Firm* — Benoît & Côté

(57) ABSTRACT

There is described a method implemented on a social search server for presenting names of members of a social network who shared information about a commercial item to a user performing a search from a user interface of a user device. The user is registered on the social network and has connections thereon. The method comprises: indexing data representative of activities of the members on the social network; extracting commercial items from the indexed activity data; receiving a search query along with a user identifier; identifying a commercial item within the search query; using the search query and the user identifier, performing a search on the extracted commercial items specific to the user's connections to obtain names of members who shared information about the commercial item; and returning the names of the members who shared information about the commercial item to the user device.

16 Claims, 5 Drawing Sheets

SYSTEM AND METHOD FOR SEMANTIC ANALYSIS OF SOCIAL NETWORK USER ACTIVITIES

CROSS-REFERENCE TO RELATED APPLICATIONS

This application is filed under 37 CFR 1.53(b) as a continuation-in-part application of U.S. patent application Ser. No. 13/352,957 filed Jan. 18, 2012 and U.S. patent application Ser. No. 13/346,342 filed Jan. 9, 2012. This application claims priority under 35USC §120 or 365(c) of U.S. patent application Ser. No. 13/352,957 filed Jan. 18, 2012 entitled "METHOD AND SYSTEM FOR RANKING RESULTS AND PROVIDING LISTS OF EXPERTS FROM SOCIAL NETWORKS" and U.S. patent application Ser. No. 13/346,342 filed Jan. 9, 2012 and entitled "METHOD AND SYSTEM FOR AGGREGATING SEARCHABLE WEB CONTENT FROM A PLURALITY OF SOCIAL NETWORKS AND PRESENTING SEARCH RESULTS", the specifications of which are hereby incorporated herein by reference in its entirety.

BACKGROUND (a) Field

The subject matter disclosed generally relates to web search and presentation tools. More particularly, the disclosure relates to searching users' social networks.

(b) Related Prior Art

Tremendous changes have been occurring in the World Wide Web (the "Web") that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One of the more useful features of the Web and associated forms of communication such as e-mail, instant messaging, chat rooms, social networks and forums is the access to information that is useful in everyday work and social lives. There exists a substantial amount of information accessible on the Web. However, the information obtained by searching the Web is often generic and does not account for the searcher's level of education, location, socioeconomic status, interests of the user or the like. The response to a search of the Web is typically presented to the user by relevancy to the search request and/or other similar criteria which are based the wording of the search request. More often than not, the user is required to review a large amount of information that is not in fact relevant to the user's request. For instance, the user's background or knowledge in the subject matter may not match that of many of the search request results. Some information may be too detailed or technical while other information may be too generic. Likewise, if a user submits a query to a message board, blog, forum or similar on-line interactive site, many of the responses to the user's request will be from people who come from different backgrounds with different tastes and varying levels of knowledge in particular areas. This is particularly true for queries that are social in nature, wherein the responses to the request are more opinion than fact. Although some responses could be highly relevant, a large number of the responses can have low usefulness or relevance to the user's request. A user could also submit inquiries to their friends and family through e-mail, instant messaging or similar methods of communication. However, the responses may be sporadic, have no organization and may be repetitive of other requests made within the social network. Therefore, it is with respect to these considerations and others that the embodiments described herein were made.

There is therefore a need to change how people collect, find and share content on the Web.

SUMMARY

According to an embodiment, there is provided a method for presenting names of members of a social network who shared information about a commercial item to a user performing a search from a user interface of a user device, the user being registered on the social network and having connections thereon. The method comprises: indexing, by a social search server, data representative of activities of the members on the social network to produce indexed activity data; extracting, by the social search server, commercial items from the indexed activity data; receiving, by the social search server, a search query along with a user identifier from the user device; identifying, by the social search server, a commercial item within the search query; using the identified commercial item and the user identifier, performing a search, by the social search server, on the extracted commercial items specific to the user's connections to obtain names of members of the social network who shared information about the commercial item; returning, by the social search server, the names of the members who shared information about the commercial item to the user device; and presenting, on the user interface, the names of the members who shared information about the commercial item.

According to an aspect, the method further comprises gathering/obtaining, by the social search server, the identification of the commercial items.

According to an aspect, the identification of the commercial items comprises at least one of a class, a category, a type, a brand, a model, a serial number and a Stock-keeping unit (SKU).

According to an aspect, identifying the commercial item within the search query comprises cross-referencing terms in the search query with the identification of the commercial items to find at least one matching commercial item by at least one of a class, a category, a type, a brand and a model.

According to an aspect, the returning comprises ranking the commercial items by brand or model according to one of: the number of members who have shared information about the brand or model; sentiment or appreciation for the brand or model; and whether the brand or model is in stock or not.

According to an aspect, the method further comprises returning another commercial item from a class, in a category, of a type, of a brand or a model related to the identified commercial item.

According to an aspect, the method further comprises returning the number of user's connections who shared information about the commercial item.

According to an aspect, the method further comprises providing, on the user interface, a hyperlink to a more detailed description of the commercial item.

According to an aspect, the method further comprises providing, on the user interface, a hyperlink to a vendor of the commercial item.

According to an aspect, the method further comprises providing, on the user interface, a hyperlink to the activity of the member related to the commercial item.

According to an aspect, the method further comprises providing, on the user interface, price for commercial item, third party reviews concerning the commercial item, images of the commercial item, and number and names of merchants carrying the commercial item According to an aspect, the method further comprises performing a semantic analysis of indexed activity data to determine whether the activities of the members represent a recommendation for the commercial item.

According to an aspect, the recommendation comprises at least one of a "share" of the commercial items, a "like"/"dislike", a posting on a wall, a timeline or a feed, text including a review about the matched items.

According to an aspect, the performing a semantic analysis comprises analyzing activities of a member on the social network to infer information about the member.

According to an aspect, the method further comprises creating a reserved space on the user interface and presenting the names of ranked members in the reserved space.

According to an embodiment, there is provided a social search server for presenting names of members of a social network who shared information about a commercial item to a user performing a search from a user interface of a user device, the user being registered on the social network and having connections thereon. The social search server comprises: an input for receiving a search query along with a user identifier; an indexing engine for indexing data representative of activities of the members on the social network to produce indexed activity data and for extracting commercial items from the indexed activity data; a searching engine identifying a commercial item within the search query and, using the search query and the user identifier, performing a search on the extracted commercial items specific to the user's connections to obtain names of members of the social network who shared information about the commercial item; and an output for returning, to the user device, the names of the members who shared information about the commercial item for presentation on the user interface.

According to an embodiment, there is provided a method implemented on a social search server for presenting names of members of a social network who shared information about a commercial item to a user performing a search from a user interface of a user device, the user being registered on the social network and having connections thereon. The method comprises: indexing data representative of activities of the members on the social network to produce indexed activity data; extracting commercial items from the indexed activity data; receiving a search query along with a user identifier from the user device; identifying a commercial item within the search query; using the search query and the user identifier, performing a search on the extracted commercial items specific to the user's connections to obtain names of members of the social network who shared information about the commercial item; and returning the names of the members who shared information about the commercial item to the user device for presentation thereon.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
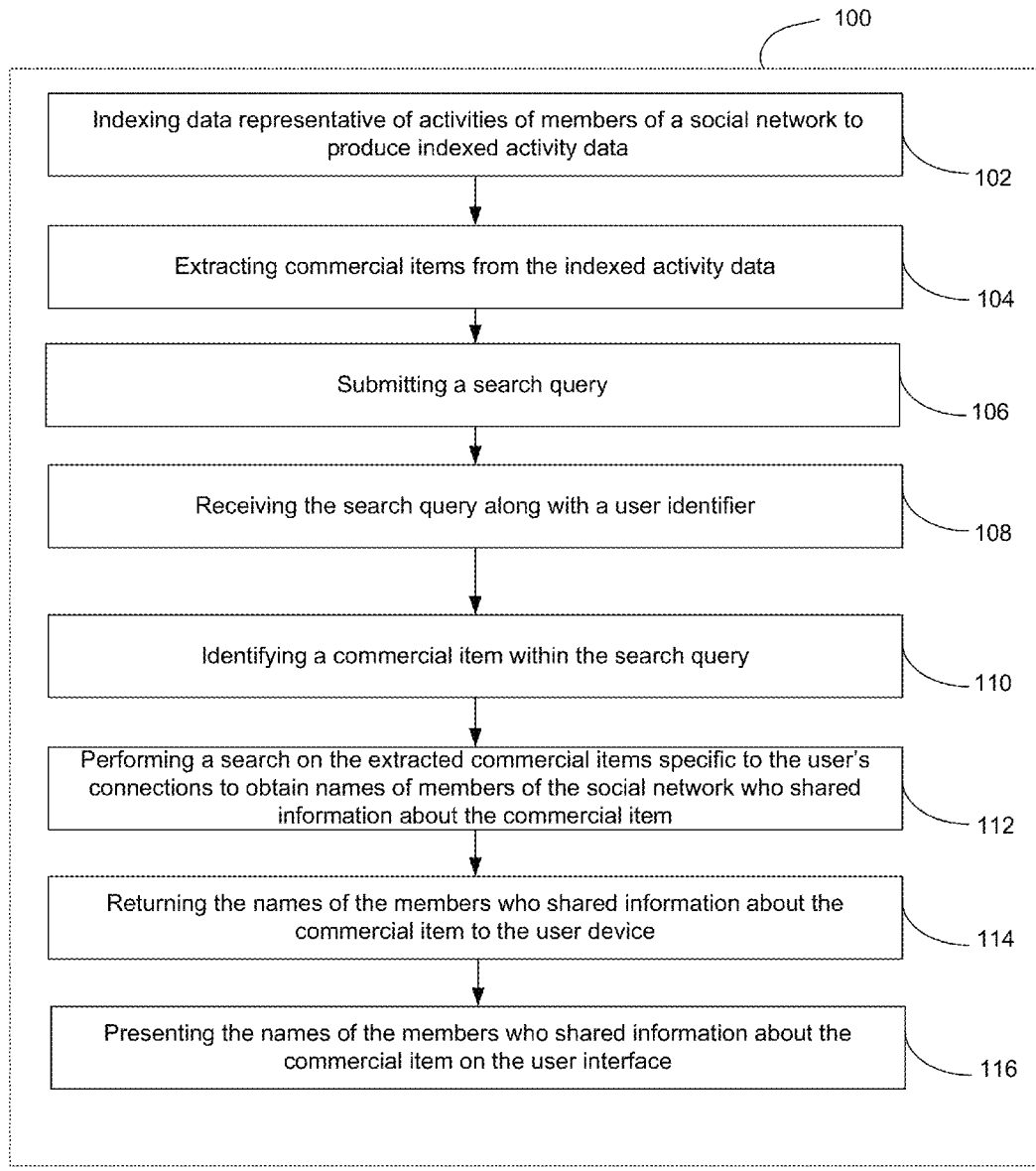
FIG. 1 is a flowchart of a method for obtaining names presenting names of members of a social network who shared information about a commercial item in accordance with an embodiment.

Referring to FIG. 1, there is shown an embodiment of a method 100 for presenting names of members of a social network who shared information about a commercial item to a user performing a search from a user interface of a user device. The user performs a search from a user interface of a user device. In an embodiment, the search is performed using a search engine. The user is registered on the social network and has connections thereon.

In an embodiment, the method 100 is performed in the context where the user is registered on a plurality of social networks. The method therefore aggregates searchable web content (i.e., social data) from a plurality of social networks. The user is registered on one or more social networks and has connections (e.g., friends) thereon.

Method 100 comprises the steps outlined hereafter. At step 102, a social search server indexes data representative of activities of the members on the social network to produce indexed activity data. The indexing by the social search server is meant to include collecting, parsing, and storing of data available from the one or more social networks to facilitate fast and accurate information retrieval. According to an embodiment, commercial items are parsed or extracted from the indexed data (step 104). The extracted list of commercial items associated to a user is then matched to SKUs. SKU refers to a Stock-keeping unit, a unique identifier for each distinct product and service (i.e., commercial item) that can be purchased in business.

At step 106, the user submits a search query. At step 108, the social search server receives the search query along with a user identifier from the user device.

At step 110, the social search server, identifies a commercial item within the search query. At step 112, the social search server, using the identified commercial item and the user identifier, performs a search on the extracted commercial items specific to the user's connections to obtain names of members of the social network who shared information about the commercial item. According to an embodiment, the names of members of the social network are shown with their sentiment/appreciation concerning the commercial item whether the sentiment or appreciation is positive, neutral or negative.

At step 114, the social search server returns the names of the members who shared information about the commercial item to the user device. At step 116, the user interface presents the names of the members who shared information about the commercial item. Examples of commercial items encompass products, places, stores, services, bands, videos, etc.

According to an embodiment, the search query is also received by a search engine server which returns customary search results. Furthermore, the step of presenting 114, on the user interface, comprises presenting the names of the members who shared information about the commercial item concurrently with the customary search results returned by the search engine.

According to an embodiment, the search engine is hosted on a website. Additionally, the data representative of activities of the members on the social network is obtained from the social network hosted on a website that is different from the website hosting the search engine.

According to an embodiment, the activities of members on the social network comprise at least one of: posting, liking, commenting on, providing links, adding to or modifying profile information, living in a given location, geolocalization information, etc., sharing content, providing articles, and providing videos relating to the commercial item.

According to an embodiment, the method 100 further comprises gathering/obtaining, by the social search server, the identification of the commercial items.

According to an embodiment, the identification of the commercial items comprises at least one of a class, a category, a type, a brand, a model, a serial number and a Stock-keeping unit (SKU). Identification includes names, pictures, alphanumeric codes, part numbers, serial numbers, etc. An example of a model would be "iPhone 4S". For the "iPhone 4S" example, the brand would be "Apple". Keeping with the same commercial item example, the type could be "smart phone", the category could be "cellular phone" and the class could be "phone". It is understood that in some examples, the class, the category and the type may overlap or may even be interchangeable.

According to an embodiment, the step 110 of identifying the commercial item within the search query comprises cross-referencing terms in the search query with the identification of the commercial items to find at least one matching commercial item by at least one of a class, a category, a type, a brand and a model. According to an embodiment, related items items will also be found. For example if the user searches for a iPhone, a Nexus phone will also be proposed. If the user searches for a category like "phone", all phones such iPhone, Nexus brand phones, etc. shared by friends will be proposed.

According to an embodiment, the step 114 of returning comprises ranking the commercial items by brand or model according to the number of members who have shared information about the brand or model. It is understood that information shared about a commercial item includes sentiment and appreciation therefor.

According to an embodiment, the method 100 further comprises returning another commercial item from a class, in a category, of a type, of a brand or a model related to the identified commercial item.

According to an embodiment, the method 100 further comprises returning the number of user's connections who shared information about the commercial item.

According to an embodiment, the method 100 further comprises providing, on the user interface, a hyperlink to a more detailed description of the commercial item.

According to an embodiment, the method 100 further comprises providing, on the user interface, a hyperlink to a vendor of the commercial item. Other information that may be provided on the user interface include price, third party reviews, images, number and names of merchants carrying the commercial item, etc.

According to an embodiment, the method 100 further comprises providing, on the user interface, a hyperlink to the activity of the member related to the commercial item.

According to an embodiment, the method 100 further comprises performing a semantic analysis of indexed activity data to determine whether the activities of the members represent a recommendation for the commercial item.

According to an embodiment, the recommendation comprises at least one of a "share" of the commercial items, a "like"/"dislike", a posting on a wall/timeline/feed, text including a review about the matched items.

According to an embodiment, the performing a semantic analysis comprises analyzing activities of a member on the social network to infer information about the member.

According to an embodiment, the method 100 further comprises creating a reserved space on the user interface and presenting the names of ranked members in the reserved space.

Figure 2:
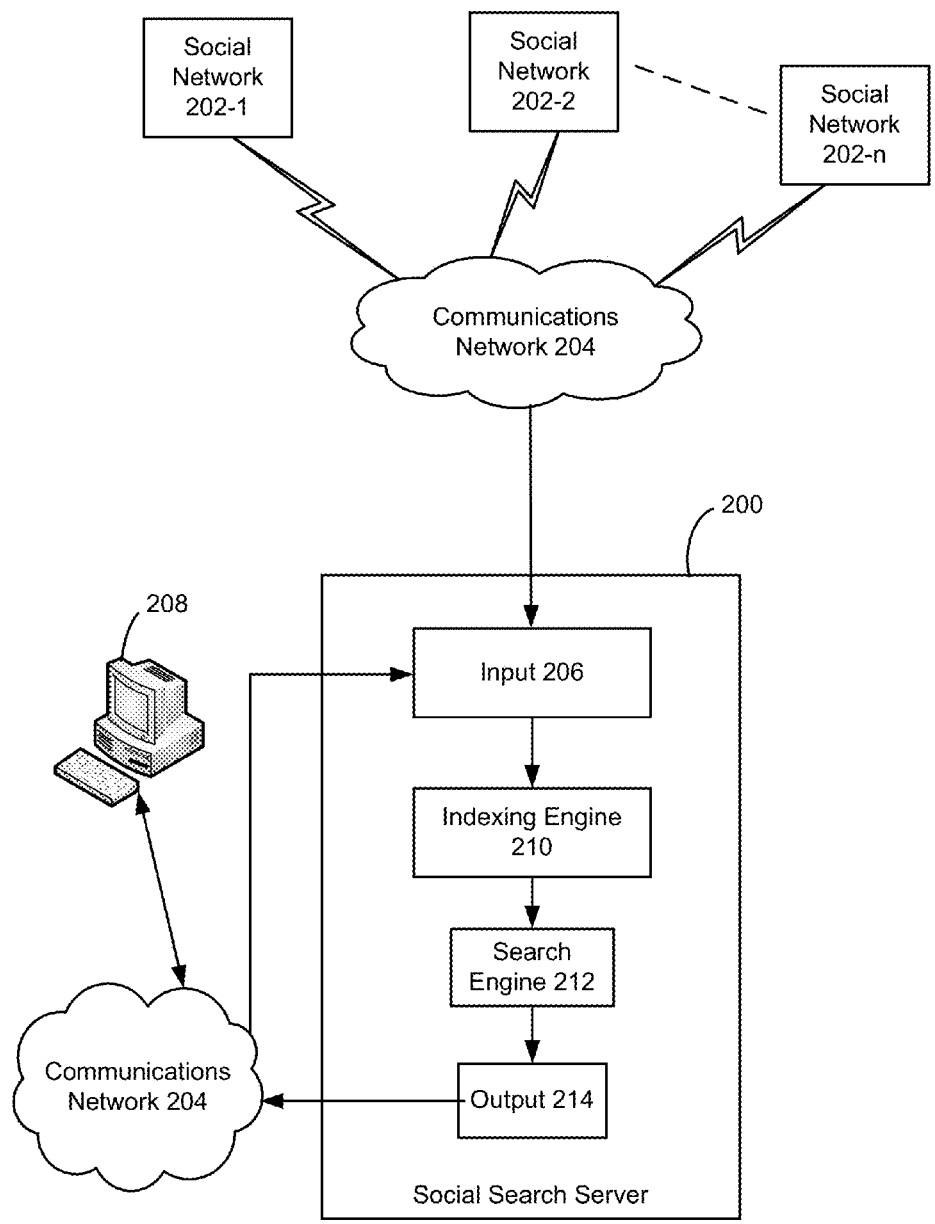
FIG. 2 is a block diagram of an exemplary social search server obtaining names of qualified experts who are members of a social network in accordance with an embodiment.

Now turning to FIG. 2, there is shown a block diagram of an exemplary social search server 200 and its immediate operating environment for presenting names of members of a social network who shared information about a commercial item according to the methods described herein.

According to an embodiment, the social search server 200 comprises an input 206, an indexing engine 210, a search engine 212 and an output 214. The social search server 200 may also include a database (not shown) or have access to an external database.

The input 206 is for receiving a search query from the user computer device 208 along with a user identifier. The indexing engine 210 is for indexing data representative of activities of members of the social network on the social network to produce indexed activity data which can be stored in a database (not shown, internal or external to the social search server 200).

The search engine 212 identifies a commercial item or category within the search query, uses the user identifier to find indexed activity data specific to the user's connections. Furthermore, the search engine 212 uses the search query relative to the subject for performing a search on the indexed data specific to the user's connections to obtain names of members of the social network who shared information about the commercial item.

The output 214 returns to the user device, the names of the members who shared information about the commercial item for presentation on the user interface.

In an embodiment, the social search server 200 updates its content on regular basis e.g. daily and/or every time a user makes a request, to provide the user with real time or nearly real time results and recommendations.

The social search server 200 obtains data concerning a user from one or more social networks 202 over a communication network 204 such as the Internet, or any other type of wired and/or wireless communication networks. Examples of social media networks include but are not limited to: Facebook, LinkedIn, Google Plus and Google related networks, Twitter, Foursquare, MySpace, email such as Gmail and Hotmail, etc. The data obtained from the social networks includes activity data such as sharing, commenting, liking/recommending, posting, etc.

The social search server 200 is also connected to the user computer device 208 over communication network 204. In general, the social search server 200 collects the data from the remote servers of the social networks 202, processes the data locally and then provides the results to the user computer device 208 over the communication network 204. In the case where the data is unstructured or semi-structured, e.g., HTML content, the social search server 200 scrapes the data from the remote servers of the social networks 202.

In an embodiment, the user of the user computer device 208 has to open an account and create a user profile with the social search server 200. The user may link their profile with the social search server 200 to one or more accounts at one or more social networks 202.

In an embodiment, the social search server 200 updates its content on a regular basis e.g. real-time, daily and/or every time a user computer device 208 makes a request, to provide the user computer device 208 with real-time or nearly real-time results and recommendations.

Figure 3:
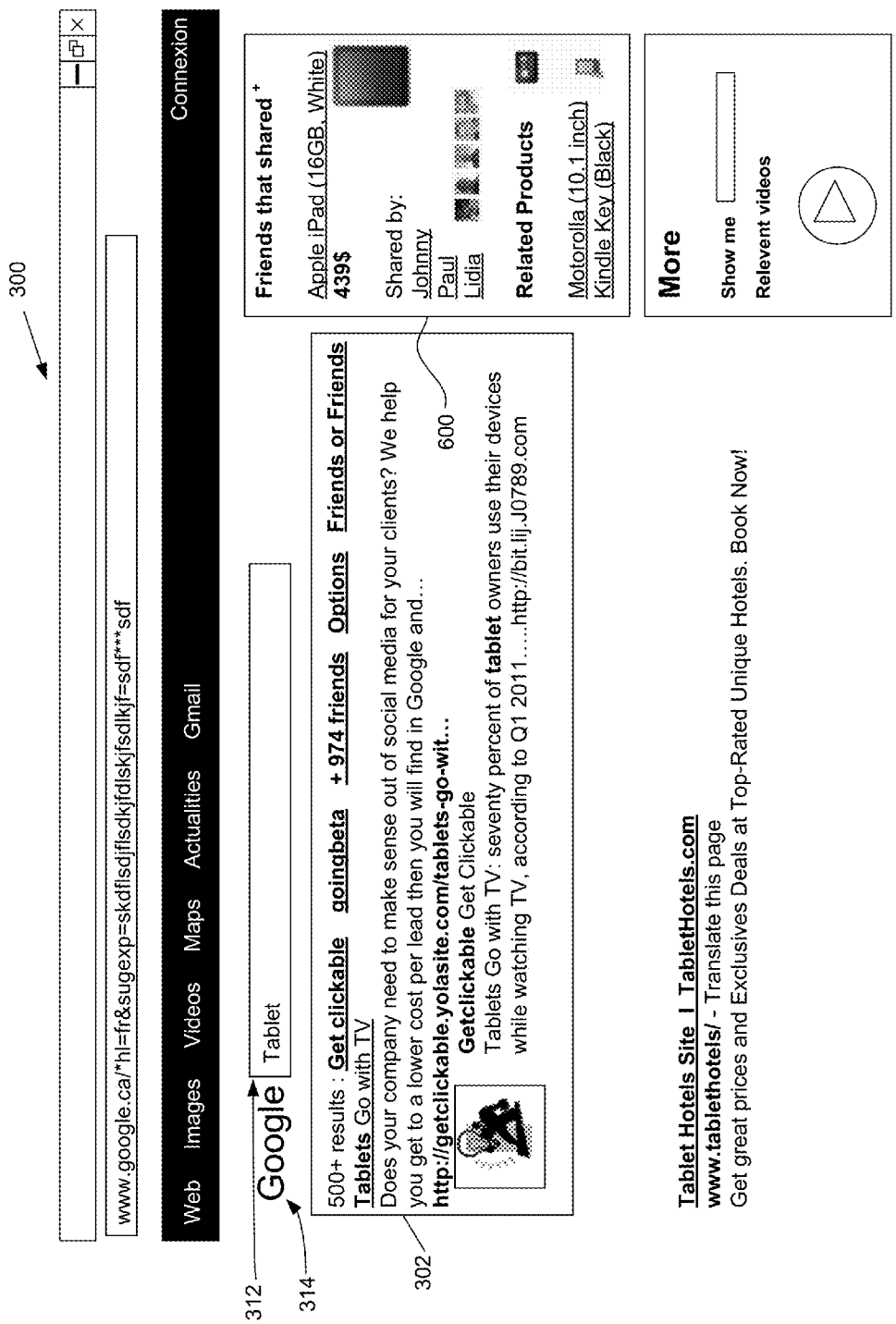
FIG. 3 is a screen shot of a web browser interface on which the method of FIG. 1 is embodied.

Now turning to FIG. 3, there is shown a screen shot of a web browser 300 implemented on the user computer device 208 (see FIG. 2). Examples of browsers include: Internet Explorer, Safari, Firefox, Google Chrome, Opera, etc.

The web browser 300 comprises a reserved space 302 for presenting the user's social network search results and connections (e.g., friends) of the user as well as connections of the connections of the user (e.g., friends of friends: FoF).

The web browser 300 comprises a search query box 312 and provides access to a search engine 314. Examples of search engines include: Google, Yahoo!, Bing, etc.

Figure 4:
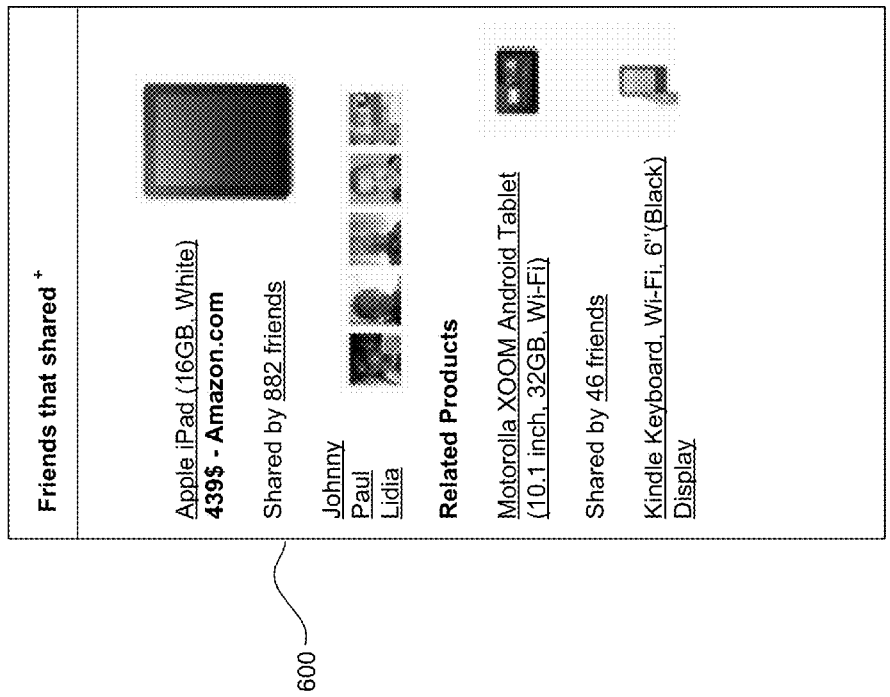
FIG. 4 is another screen shot of a web browser interface on which the method of FIG. 1 is embodied.

The web browser 300 comprises a reserved space 600 for presenting names of members of a social network who shared information about a commercial item. The reserved space 600 is shown in close-up form in FIG. 4.

Figure 5:
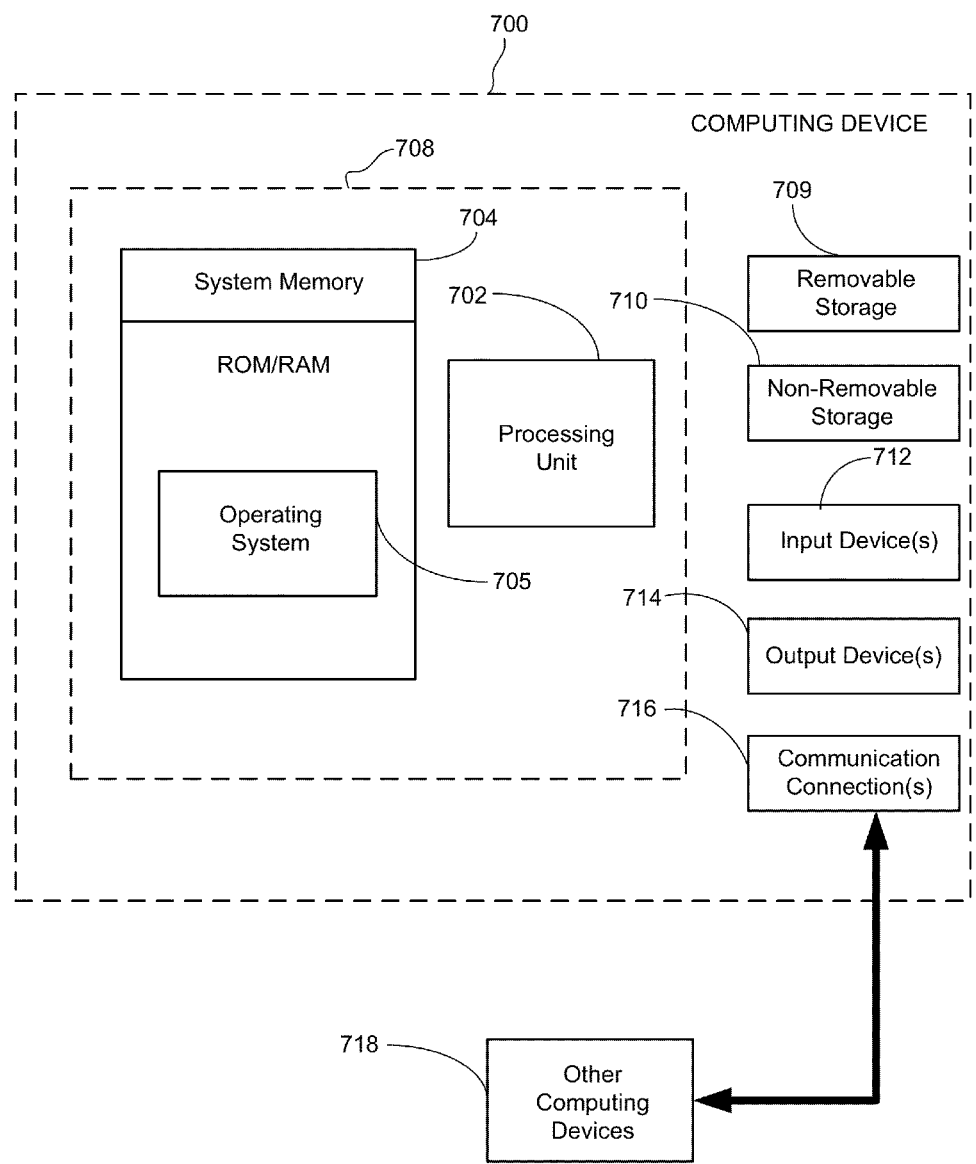
FIG. 5 illustrates a block diagram of an exemplary computing environment.

FIG. 5 and the associated discussion are intended to provide a brief, general description of a suitable computing environment in which embodiments of the social search server 200 and of the user computer device 208 (see FIG. 2) may be implemented. It should be noted that the user computer device 208 may include, but is not limited to, one of a desktop, a laptop, an iPad, an iPhone, a smart phone, or any computing device having an operating system which can implement the embodiments described herein.

With reference to FIG. 5, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer or a server (such as the social search server 200). This basic configuration is illustrated in FIG. 5 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 5 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators. These human operators need not be collocated with each other, but each can be only with a machine that performs a portion of the program.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for presenting names of members of a social network who shared information about a commercial item to a user performing a search from a user interface of a user device, the user being registered on the social network and having connections thereon, the method comprising:
   collecting, by a social search server, data representative of activities of the members on the social network from a remote server associated with the social network;
   indexing, by the social search server, the data representative of activities of the members on the social network to produce indexed activity data;
   extracting, by the social search server, commercial items from the indexed activity data;
   receiving, by the social search server, a search query along with a user identifier from the user device;
   identifying, by the social search server, a commercial item within the search query;
   using the identified commercial item and the user identifier, performing a search, by the social search server, on the extracted commercial items specific to the user's connections to obtain names of members of the social network who shared information about the commercial item;

performing a semantic analysis of the shared information to determine if the shared information represents a recommendation for the commercial item;

returning, by the social search server, the names of the members who shared information about the commercial item to the user device; and presenting, on the user interface, the names of the members who shared information about the commercial item.

2. The method of claim 1, further comprising gathering/obtaining, by the social search server, the identification of the commercial items.

3. The method of claim 2, wherein the identification of the commercial items comprises at least one of a class, a category, a type, a brand, a model, a serial number and a Stock-keeping unit (SKU).

4. The method of claim 3, wherein identifying the commercial item within the search query comprises cross-referencing terms in the search query with the identification of the commercial items to find at least one matching commercial item by at least one of a class, a category, a type, a brand and a model.

5. The method of claim 4, wherein the returning comprises ranking the commercial items by brand or model according to one of:

the number of members who have shared information about the brand or model;

sentiment or appreciation for the brand or model; and whether the brand or model is in stock or not.

6. The method of claim 5, further comprising returning another commercial item from a class, in a category, of a type, of a brand or a model related to the identified commercial item.

7. The method of claim 1, further comprising returning the number of user's connections who shared information about the commercial item.

8. The method of claim 1, further comprising providing, on the user interface, a hyperlink to a more detailed description of the commercial item.

9. The method of claim 1, further comprising providing, on the user interface, a hyperlink to a vendor of the commercial item.

10. The method of claim 1, further comprising providing, on the user interface, a hyperlink to the activity of the member related to the commercial item.

11. The method of claim 1, further comprising providing, on the user interface, price for commercial item, third party reviews concerning the commercial item, images of the commercial item, and number and names of merchants carrying the commercial item.

12. The method of claim 1, where the recommendation comprises at least one of a "share" of the commercial items, a "like"/"dislike", a posting on a wall, a timeline or a feed, text including a review about the matched items.

13. The method of claim 1, wherein the performing a semantic analysis comprises analyzing activities of a member on the social network to infer information about the member.

14. The method of claim 1, further comprising creating a reserved space on the user interface and presenting the names of ranked members in the reserved space.

15. A social search server for presenting names of members of a social network who shared information about a commercial item to a user performing a search from a user interface of a user device, the user being registered on the social network and having connections thereon, the social search server comprising:

an input for collecting data representative of activities of the members on the social network from a remote server associated with the social network and for receiving a search query along with a user identifier;

an indexing engine for indexing data representative of activities of the members on the social network to produce indexed activity data and for extracting commercial items from the indexed activity data;

a searching engine identifying a commercial item within the search query, using the search query and the user identifier, performing a search on the extracted commercial items specific to the user's connections to obtain names of members of the social network who shared information about the commercial item, and performing a semantic analysis of the shared information to determine if the shared information represents a recommendation for the commercial item; and an output for returning, to the user device, the names of the members who shared information about the commercial item for presentation on the user interface.

16. A method implemented on a social search server for presenting names of members of a social network who shared information about a commercial item to a user performing a search from a user interface of a user device, the user being registered on the social network and having connections thereon, the method comprising:

collecting data representative of activities of the members on the social network from a remote server associated with the social network;

indexing the data representative of activities of the members on the social network to produce indexed activity data;

extracting commercial items from the indexed activity data;

receiving a search query along with a user identifier from the user device;

identifying a commercial item within the search query;

using the search query and the user identifier, performing a search on the extracted commercial items specific to the user's connections to obtain names of members of the social network who shared information about the commercial item;

performing a semantic analysis of the shared information to determine if the shared information represents a recommendation for the commercial item; and returning the names of the members who shared information about the commercial item to the user device for presentation thereon.

* * * * *